(12) United States Patent
Kim

(10) Patent No.: US 6,459,679 B1
(45) Date of Patent: Oct. 1, 2002

(54) METHOD AND APPARATUS FOR SYNCHRONIZING ORTHOGONAL FREQUENCY DIVISION MULTIPLEXING (OFDM) RECEIVER

(75) Inventor: Yung-soo Kim, Sungnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/349,731

(22) Filed: Jul. 8, 1999

(30) Foreign Application Priority Data

Jul. 8, 1998 (KR) .............................. 98-27484

(51) Int. Cl.⁷ .............................................. H04J 11/00
(52) U.S. Cl. ...................................... 370/208; 370/343
(58) Field of Search ................................. 370/208, 210, 370/503, 515, 206, 343; 375/355, 354, 323

(56) References Cited

U.S. PATENT DOCUMENTS

| | | | | |
|---|---|---|---|---|
| 5,732,113 | A |   | 3/1998 | Schmidl et al. .............. 375/355 |
| 5,946,292 | A | * | 8/1999 | Tsujishita et al. ........... 370/204 |
| 6,226,337 | B1 | * | 5/2001 | Klank et al. ................. 375/367 |
| 6,269,132 | B1 | * | 7/2001 | Yonge, III ................... 375/346 |
| 6,363,084 | B1 | * | 3/2002 | Dejonghe .................... 370/480 |

OTHER PUBLICATIONS

Nogami et al. "A Frequency and Timing Period Acquisition Technique for OFDM Systems", Aug. 8, 1996, vol. E79B pp. 1146.

Morelli et al. "An Improved Frequency Offset Estimator for OFDM Applications", Mar. 3, 1999, vol. 3; 75–77.

* cited by examiner

Primary Examiner—Kwang Bin Yao
Assistant Examiner—Raj Jain
(74) Attorney, Agent, or Firm—Lee & Sterba, P.C.

(57) ABSTRACT

A method and apparatus for synchronizing an OFDM receiver is provided. The method includes the steps of: (a) receiving an OFDM reference symbol before user data OFDM symbols, the OFDM reference symbol having sub-symbol signals at only random, even-numbered sub-carriers and having no signals at any other even-numbered sub-carriers and all odd-numbered sub-carriers in the frequency domain, and the first half of the symbol having the same characteristics as the remaining half in the time domain; (b) obtaining OFDM digital signal samples $r_k$ by sampling the received OFDM reference symbol and converting the OFDM reference symbol samples into digital signals; (c) obtaining a predetermined timing metric for each of the OFDM signal samples $r_k$ according to the time-domain characteristics of the reference symbol, and detecting the point in time at which the power of the timing metric is maximum as the starting point of a symbol/frame of the OFDM signal; and (d) correcting for the offsets of sub-carrier frequencies that are less than is the frequency spacing between two adjacent sub-carriers by obtaining a frequency offset from the phase of the timing metric at the detected symbol/frame starting point, and correcting for the offsets of sub-carrier frequencies that are greater than the frequency spacing between two adjacent sub-carriers by obtaining the value which maximizes the power metrics according to the frequency-domain characteristics of the reference symbol.

16 Claims, 7 Drawing Sheets

METHOD AND APPARATUS FOR SYNCHRONIZING ORTHOGONAL FREQUENCY DIVISION MULTIPLEXING (OFDM) RECEIVER

BACKGROUND OF THE INVENTION

1. Field of the Invention

The present invention relates to a method and apparatus for receiving orthogonal frequency division multiplexed (OFDM) signals, and more particularly, to a method and apparatus for timing and frequency synchronization of an OFDM signal receiver to an OFDM signal.

2. Description of the Related Art

Orthogonal frequency division multiplexing (OFDM) is a robust technique for efficiently transmitting data using a plurality of sub-carriers within a channel bandwidth. These sub-carriers are arranged for optimal bandwidth efficiency compared to more conventional transmission approaches, such as frequency division multiplexing (FDM). FDM separates and isolates the sub-carrier frequency spectra, and requires a frequency guard band to avoid inter-sub-carrier interference, thereby increasing overhead and degrading bandwidth efficiency.

By contrast, although optimal bandwidth efficiency is obtained by overlapping the frequency spectra of OFDM sub-carriers, the OFDM sub-carriers must remain orthogonal to one another to prevent interference between sub-carriers. Additionally, an OFDM symbol is resistant to multipath fading because it is significantly long compared to the length of the channel impulse response and inter-symbol interference can be completely prevented.

FIG. 1 is a block diagram of a typical OFDM signal transmitter. An encoder 110 encodes a stream of input data bits $b_n$ and outputs a stream of sub-symbols $X_n$. An inverse fast Fourier transformer (IFFT) 115 performs an N-point inverse discrete Fourier transformation (IDFT) or inverse fast Fourier transformation (IFFT) on the stream of sub-symbols $X_n$. Here, n denotes a frequency-domain index, and also can denote a sub-carrier index. N sub-symbols $X_n$ are equivalent to one frequency-domain OFDM symbol, and they are typically phase shift keyed (PSK) signals or quadrature amplitude modulated (QAM) signals.

A frequency-domain OFDM symbol is usually designated as zero at a zero-frequency DC and around the edges of a passband, as shown in FIG. 2. Accordingly, a transmitter/receiver can easily perform analog filtering, and the influence of noise on a received signal is reduced. IFFT 115 transforms the frequency-domain OFDM symbol into a time-domain symbol according to the following Equation 1:

$$x_K = 1/N \sum_{n=0}^{N-1} X_n e^{j2\pi kn/N}, \quad k = 0, \ldots N-1 \qquad (1)$$

wherein $x_k$ denotes samples of a time-domain OFDM symbol, and k is a time-domain index.

A digital signal processor (DSP) 120 adds a cyclic prefix or guard interval of G samples before N samples, i.e., a sequence of the output of IFFT 115. Thus, one time-domain OFDM symbol is comprised of (G+N) samples, as shown in FIG. 3. The cyclic prefix is comprised of the last G samples among the output of IFFT 115. This cyclic prefix is typically longer than the channel impulse response and, therefore, acts to prevent inter-symbol interference between consecutive OFDM symbols.

The output of DSP 120 is divided into real and imaginary-valued digital components. The real and imaginary-valued digital components are then passed to digital-to-analog converters (DACs) 130 and 135, respectively. DACs 130 and 135 convert the real and imaginary-valued digital components into analog signals at a sampling frequency of fs=1/Ts Hz as determined by a clock circuit 125. The analog signals pass through low pass filters (LPFs) 140 and 145 and become in-phase and quadrature OFDM analog signals, respectively. The in-phase and quadrature OFDM analog signals are then passed to mixers 160 and 165.

As a result of the above IFFT, D/A conversion, and low pass filtering, N sub-symbols in the OFDM symbol are transmitted by being carried on N sub-carriers. As shown in FIG. 4, the sub-carriers each display a sinc(x)=sin(x)/x spectrum in the frequency domain, and the peak frequencies of the sub-carriers are spaced fs/N=1/NTs Hz apart from each other. Here, when the time for N samples in one OFDM symbol is T. T is equal to NTs. Also, although the spectra of the sub-carriers overlap, a given sub-carrier remains orthogonal to neighboring sub-carriers because neighboring sub-carriers become null at the peak of the given sub-carrier.

In mixers 160 and 165, the in-phase and quadrature OFDM analog signals from LPF 140 and 145 are mixed with an in-phase intermediate frequency (IF) signal and a 90° phase-shifted IF signal, respectively, in order to produce an in-phase IF OFDM signal and a 90° phase-shifted (quadrature) IF OFDM signal, respectively. The in-phase IF signal fed to the mixer 160 is produced directly by an IF local oscillator (Lo) 150, while the 90° phase-shifted IF signal fed to the mixer 165 is produced by passing the in-phase IF signal produced by Lo 150 through a 90° phase-shifter 155 before feeding it to mixer 165. These two in-phase and quadrature IF OFDM signals are then combined in a combiner 167, and the combined IF OFDM signal is transmitted via a radio frequency (RF) signal transmitter 170.

The RF signal transmitter 170 includes a bandpass filter (BPF) 175, an RF mixer 183, an RF carrier frequency local oscillator (Lo) 180, another BPF 185, an RF power amplifier 190, and an antenna 195. The combined IF OFDM signal from combiner 167 is filtered by the BPF 175, and shifted by the frequency of the Lo 180 by the mixer 183. The frequency-shifted signal is again filtered by the BPF 185, amplified by the RF power amplifier 190, and finally transmitted via the antenna 195. When the sum of the frequencies of the Lo 150 and the Lo 180 is fc for convenience' sake, fc becomes the central frequency of a passband signal, i.e., a carrier frequency. The frequency fs of the clock circuit 125 determines the bandwidth of a transmitted signal and the sub-carrier frequency interval.

A receiver for receiving signals transmitted through the above-described process and restoring original data bits is essentially configured such that its component units are arranged opposite to those of the transmitter. FIG. 5 is a block diagram of the configuration of a typical OFDM signal receiver. An RF receiver 210 usually includes an antenna 212, a low noise amplifier 215, a bandpass filter BPF 217, an automatic gain controller (AGC) 220, an RF mixer 222, an RF carrier frequency local oscillator (Lo) 225, and an IF BPF 227. The low noise amplifier 215 amplifies an RF signal received from the antenna 212. BPF 217 bandpass-filters the amplified RF signal. AGC 220 automatically keeps the magnitude of the filtered signal at a predetermined magnitude. The mixer 222 converts the RF signal into an IF signal, and BPF 227 bandpass-filters the output of the mixer 222 and passes only a desired IF signal. Lo 225 determines the degree of frequency shifting when the RF signal is converted into the IF signal by mixer 222.

The IF signal output from the BPF 227 is converted into an analog baseband in-phase signal and an analog baseband quadrature signal while passing through mixers 230 and 235 and LPFs 250 and 255. An Lo 240 determines the degree of frequency shifting when the IF signal is converted into baseband signals. Analog-to-digital converters (ADCs) 260 and 265 convert the output signals of LPFs 250 and 255 into digital signals, respectively. The operational frequencies of the ADCs 260 and 265 are determined by the frequency of a clock circuit 270.

A DSP 275 removes a cyclic prefix added to each OFDM symbol from a complex sample signal $r_k$ of the output signals of ADCs 260 and 265, finds the FFT start position, and outputs N samples to an FFT 280. FFT 280 performs a fast-Fourier-transformation on the cyclic prefix-removed signal, and outputs a frequency domain signal $R_n$. $R_n$ is expressed by the following Equation 2:

$$R_n = \sum_{k=0}^{N-1} r_k e^{-j2\pi kn/N}, \quad n = 0, \ldots, N-1 \quad (2)$$

A detector/decoder 285 detects an originally-transmitted sub-symbol from $R_n$, decodes it, and outputs a binary data sequence.

In the OFDM signal transmission and reception as described above, the receiver must be exactly synchronized with the transmitter. The synchronization will now be described.

First, the receiver finds the exact FFT starting point of each OFDM symbol, removes a cyclic prefix from each OFDM symbol, and performs an FFT. If the receiver does not detect the correct FFT starting position of each OFDM symbol from a received signal, data detection error is increased by the interference between adjacent OFDM symbols during output of a fast-Fourier-transformed signal.

Second, the sum fc' of local oscillator frequencies in the receiver must be the same as the sum fc of the local oscillator frequencies in the transmitter. Here, fc is the same as the carrier frequencies of a transmitted signal. If fc' is not exactly consistent with $f_c$, a frequency offset $\Delta f_c = f' - f_c$ exists in the received complex signal $r_k$. Since an OFDM signal is very sensitive to this frequency offset, interference between sub-carriers is generated in a received signal. Thus, data detection failure suddenly increases.

Third, the clock frequency fs' supplied to the ADC in the receiver must be the same as the clock frequency fs supplied to the DAC in the transmitter. When the sampling clock frequencies are not the same, the frequency-domain signal is proportional to the frequency index. Thus, the interference between sub-carriers increases, and the phases of sub-symbols vary, thereby increasing data errors.

In the U.S. Pat. No. 5,732,113, two reference symbols are used to accomplish the symbol timing synchronization, the carrier frequency synchronization, and the sampling clock synchronization.

SUMMARY OF THE INVENTION

To solve the above problem, it is an objective of the present invention to provide an OFDM receiver synchronizing method and apparatus for accomplishing symbol/frame timing synchronization, carrier frequency synchronization, and sampling clock frequency synchronization with respect to an OFDM signal using one reference symbol.

Accordingly, to achieve the above objective, there is provided a method of synchronizing an OFDM receiver to an OFDM signal comprising the steps of: (a) receiving an OFDM reference symbol before user data OFDM symbols, the OFDM reference symbol having sub-symbol signals at only random, even-numbered sub-carriers and having no signals at any other even-numbered sub-carriers and all odd-numbered sub-carriers in the frequency domain, and the first half of the symbol having the same characteristics as the remaining half in the time domain; (b) obtaining OFDM digital signal samples $r_k$ by sampling the received OFDM reference symbol and converting the OFDM reference symbol samples into digital signals; (c) obtaining a predetermined timing metric for each of the OFDM signal samples $r_k$ according to the time-domain characteristics of the reference symbol, and detecting the point in time at which the power of the timing metric is maximum as the starting point of a symbol/frame of the OFDM signal; and (d) correcting for the offsets of sub-carrier frequencies that are less than the frequency spacing between two adjacent sub-carriers by obtaining a frequency offset from the phase of the timing metric at the detected symbol/frame starting point, and correcting for the offsets of sub-carrier frequencies that are greater than the frequency spacing between two adjacent sub-carriers by obtaining the value which maximizes the power metrics according to the frequency-domain characteristics of the reference symbol.

To achieve the above objective, there is provided an apparatus for synchronizing an OFDM receiver, comprising: an OFDM signal receiving portion for receiving an OFDM reference symbol before user data OFDM symbols, the OFDM reference symbol having sub-symbol signals carried by random, even-numbered sub-carriers and having no signals carried by the other even-numbered sub-carriers and all odd-numbered sub-carriers in the frequency domain, and the first half of the symbol has the same characteristics as the second half in the time domain; an analog-to-digital converter (ADC) for sampling the received OFDM reference symbol, converting the OFDM reference symbol samples into digital signals, and outputting OFDM digital signal samples $r_k$; and an operation processor for storing the OFDM digital signal samples $r_k$ in an internal buffer, detecting the starting point of a symbol/frame which satisfies a predetermined timing metric, from the time-domain characteristics of the stored samples, obtaining a carrier frequency offset from the phase of the metric at the detected starting point and correcting for the offset, and obtaining the sampling period error of the ADC from the phase difference generated when the stored N samples are transformed into two N/2 frequency-domain symbols and correcting for the error.

BRIEF DESCRIPTION OF THE DRAWINGS

The above objective and advantage of the present invention will become more apparent by describing in detail a preferred embodiment thereof with reference to the attached drawings in which.

DESCRIPTION OF THE PREFERRED EMBODIMENT

The basic technical spirit of the present invention is in the use of one reference symbol to accomplish symbol/frame timing synchronization, carrier frequency synchronization, and sampling clock frequency synchronization of an OFDM signal.

Figure 1:
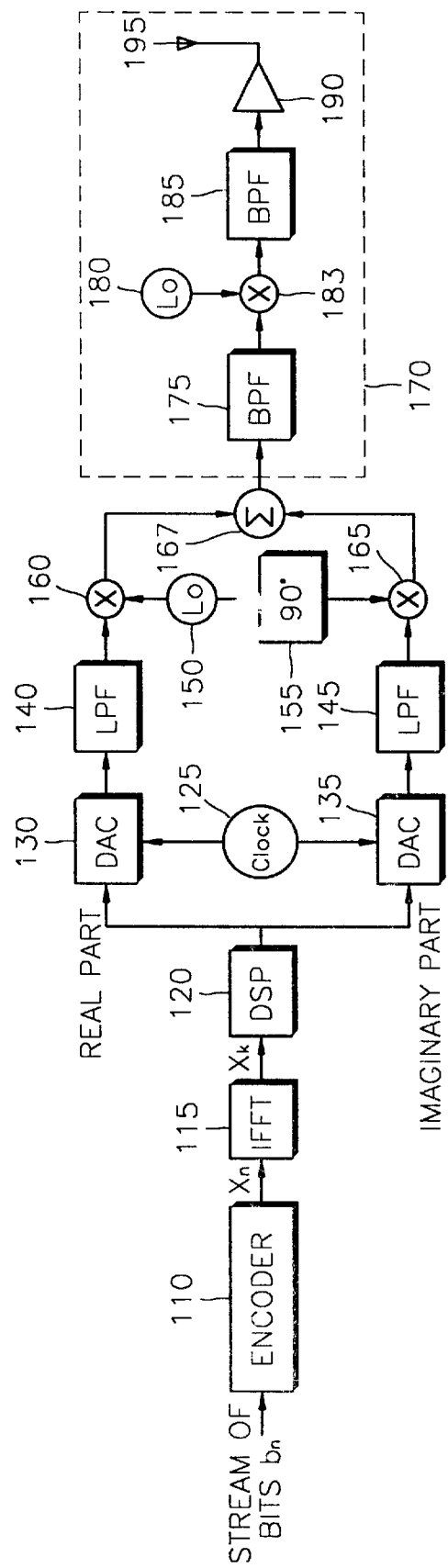
FIG. 1 is a block diagram of a typical OFDM signal transmitter according to the prior art.
Figure 2:
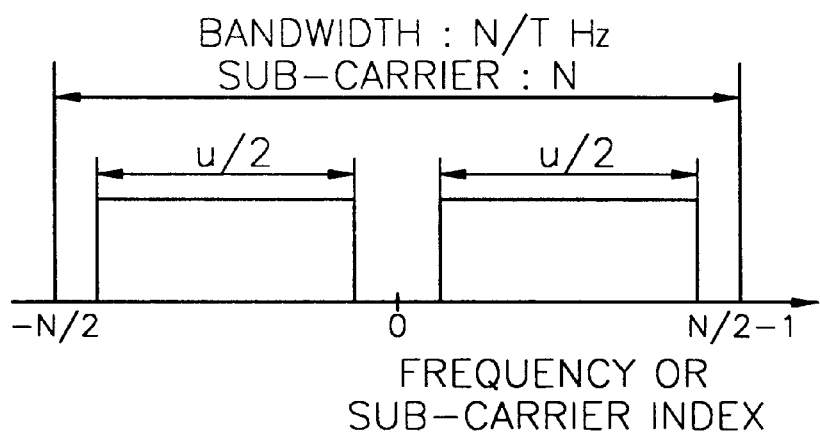
FIG. 2 illustrates the frequency-domain characteristics of a typical OFDM signal.
Figure 3:
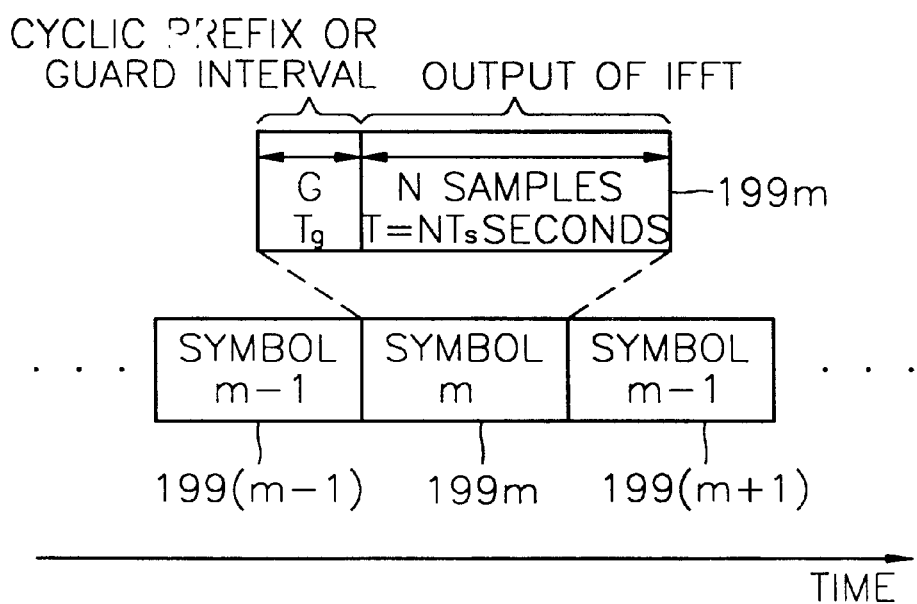
FIG. 3 illustrates a typical OFDM symbol sequence in the time domain.
Figure 4:
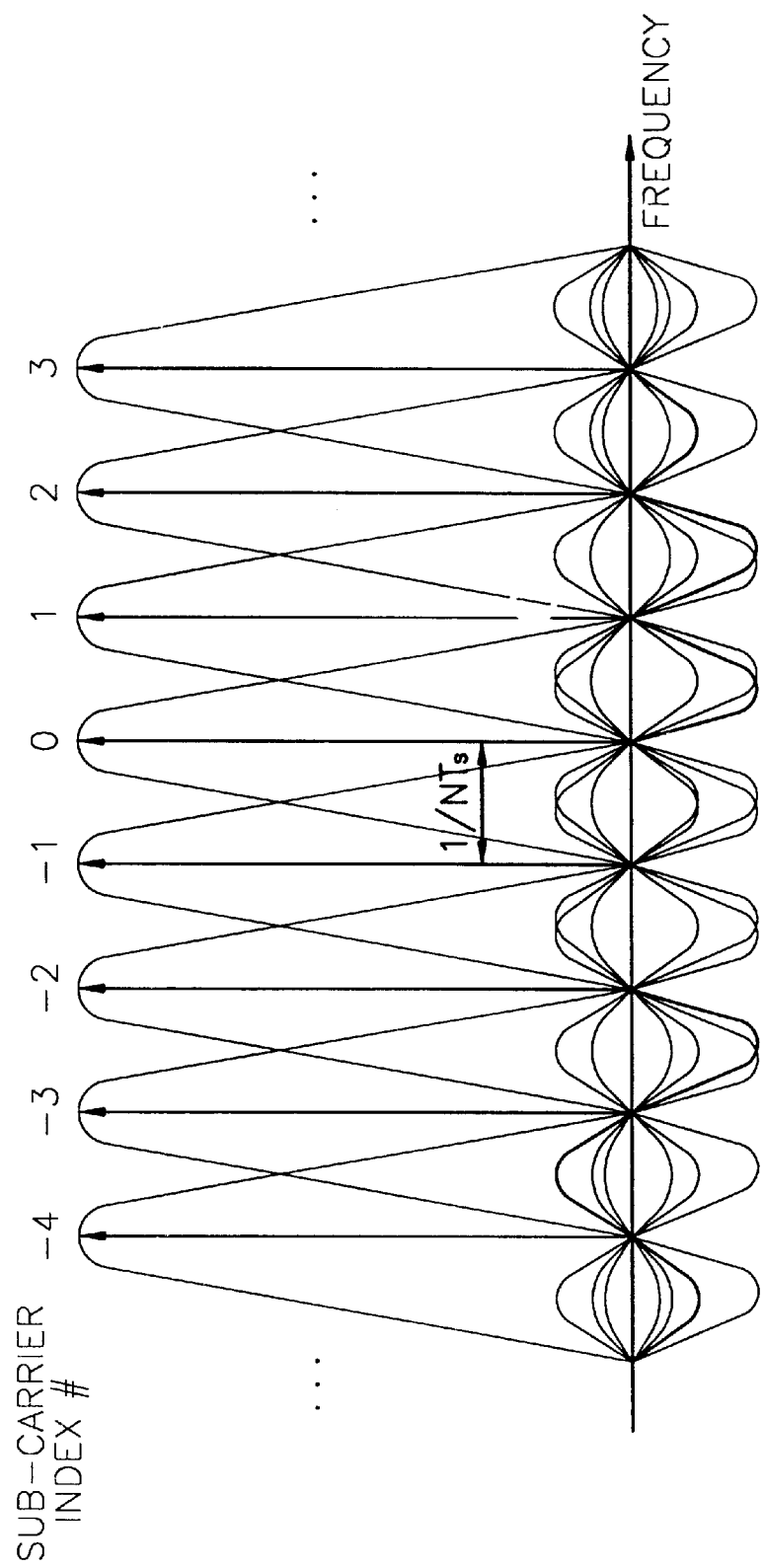
FIG. 4 shows the shape of a typical OFDM sub-carrier.
Figure 5:
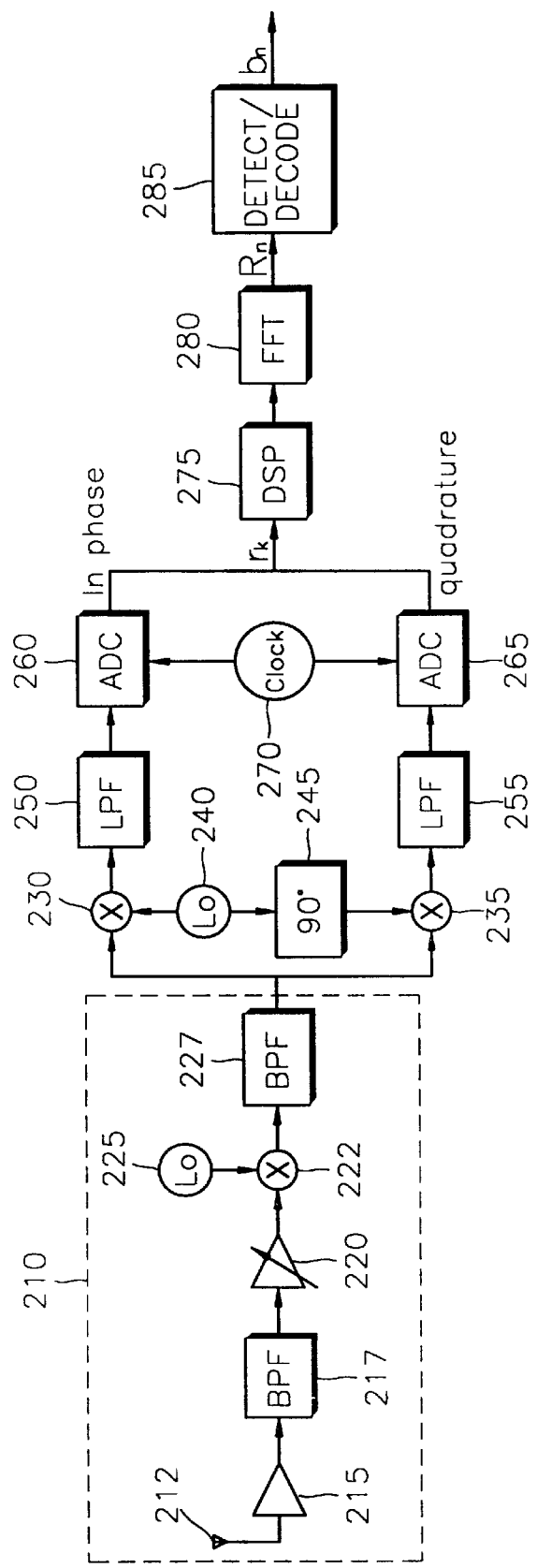
FIG. 5 is a block diagram of a typical OFDM signal receiver according to the prior art.
Figure 6:
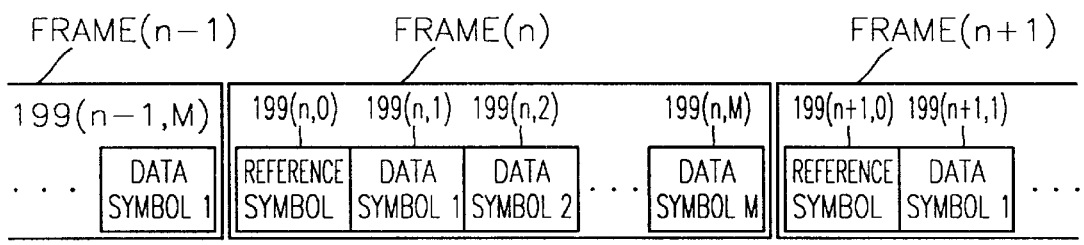
FIG. 6 shows a reference symbol existing at a specific position in each frame when user data symbols are transmitted in a sequence of frames.
Figure 7:
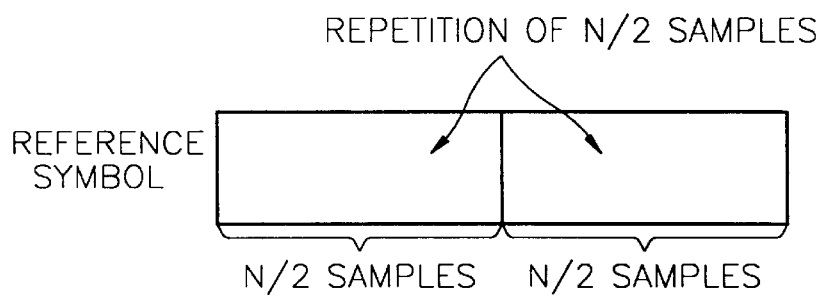
FIG. 7 shows the time-domain characteristics of a reference symbol used in the present invention.

The reference symbol is transmitted at the start or in a predetermined position of each data frame. In the frequency domain, the reference symbol has PSK sub-symbol signals existing at random, even-numbered sub-carriers, and no signals existing at any other sub-carriers. Since the reference symbol has signals in only the even-numbered sub-carriers, the first half of the reference symbol has the same characteristics as the remaining half in the time domain. An OFDM symbol for typical user data does not have such characteristics, so that reference symbols are easily distinguished from user data symbols. In the present invention, signal synchronization is accomplished by detecting the reference symbol having such characteristics in a received signal and analyzing the detected reference symbol. FIG. 6 shows an example of the transmission of reference symbols and user data symbols in data frames. FIG. 7 shows the time-domain characteristics of the reference symbol.

Figure 8:
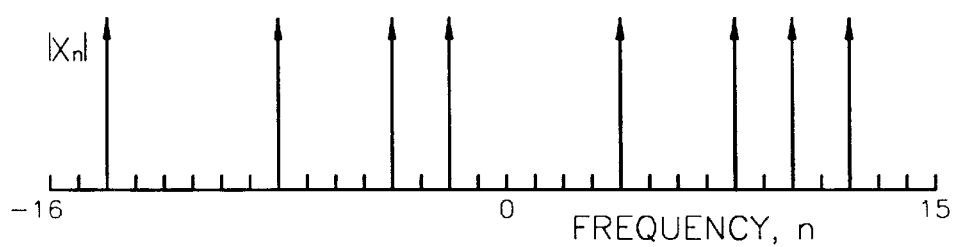
FIG. 8 shows the frequency characteristics of a reference symbol used in the present invention.

An example of a reference symbol constructing method according to the present invention will now be described. Odd numbered sub-carriers in the frequency domain are all designated as zero. Each of the even-numbered sub-carriers is obtained by multiplying a PSK sub-symbol $C_n$ produced from a random or pseudo-random sequence by a random or pseudo-random binary sequence $B_n$ having values of 0 and 1, and is expressed by the following Equation 3:

$$X_n = \begin{cases} C_{n/2}B_{n/2}, & n = \text{even number}, \ n \neq 0 \\ 0, & \text{elsewhere} \end{cases} \quad (3)$$

wherein the sub-symbol $X_0$ having a frequency n=0 is designated as zero. PSK sub-symbol signals are only transmitted at sub-carrier frequencies where $B_n$ is equal to 1. FIG. 8 illustrates the frequency characteristics of a reference symbol produced as described above. Since the number of sub-carriers for transmitting signals in this reference symbol is about a quarter of the number of sub-carriers for transmitting a data symbol, a PSK sub-symbol $C_n$ is required to be scaled so that the power of the reference symbol becomes the same as that of a typical data symbol. Also, the reference symbol can be arbitrarily designed for a small ratio of peak power to average power. In this case, the reference symbol has a larger power than a typical data symbol, so that the performance of synchronization using the reference symbol can be further improved.

Figure 9:
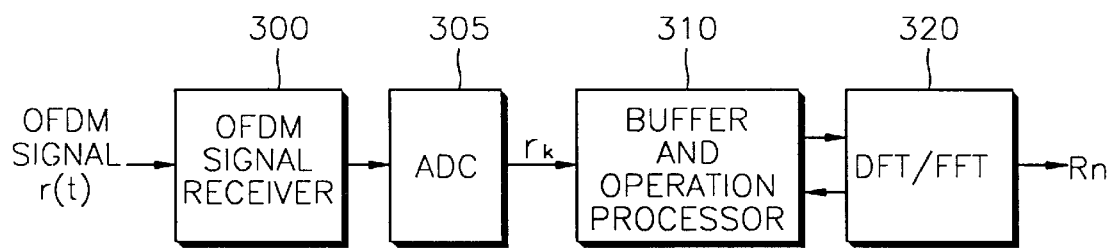
FIG. 9 is a block diagram of an example of a synchronization performing apparatus according to the present invention.

FIG. 9 shows an example of an apparatus for performing various synchronization processes according to the present invention, the apparatus including an OFDM signal receiver 300, an analog-to-digital converter (ADC) 305, a buffer and operation processor 310, and a DFT/FFT 320.

The OFDM signal receiver 300 receives an OFDM signal r(t) from an OFDM reference symbol transmitted at the start of an OFDM signal frame, i.e., before other user data OFDM symbols, when the OFDM reference symbol has sub-symbol signals existing at random, even-numbered sub-carriers and no signals at the remaining even-numbered sub-carriers and all odd-numbered sub-carriers in the frequency domain, and when the first half of the OFDM reference symbol has the same characteristics as the remaining half in the time domain.

The ADC 305 converts a received OFDM analog signal into a digital signal to obtain OFDM digital signal samples $r_k$.

The buffer and operation processor 310 performs signal processing on the digital OFDM signal samples, and provides a buffer necessary for signal processing. The buffer and operation processor 310 performs signal processing necessary for symbol/frame timing synchronization, carrier frequency synchronization, and sampling clock frequency synchronization.

DFT/FFT 320 performs DFT/FFT on a signal processed by buffer and operation processor 310.

The first operation step of an OFDM signal receiver is symbol/frame timing synchronization which is performed as follows. First, OFDM signal samples $r_k$ are stored in an internal buffer, and a symbol timing metric S(d) is obtained every sampling period and stored in the buffer. Here, S(d) is calculated by the following Equation 4:

$$S(d) = \sum_{k=0}^{N/2-1} r^*_{k+d} r_{k+d+N/2} \quad (4)$$

wherein $r_k^*$ denotes the complex conjugate of $r_k$. Since the first section of N/2 samples in the reference symbol is the same as the next section of N/2 samples, the correlation value between the two sections is very large for a received signal. However, a typical data symbol has a significantly small correlation value.

Next, the power $|S(d)|^2$ of the symbol timing metric is compared with a predetermined threshold value. The starting point of a symbol/frame is determined to be at a point in time ($d_{opt}$) when the power is maximum, in an area where the symbol timing metric power is larger than the threshold value.

In this step, the threshold value is obtained from the power of a signal. For example, 50% of the entire power value of N/2 signal samples can be used as the threshold value.

Figure 10:
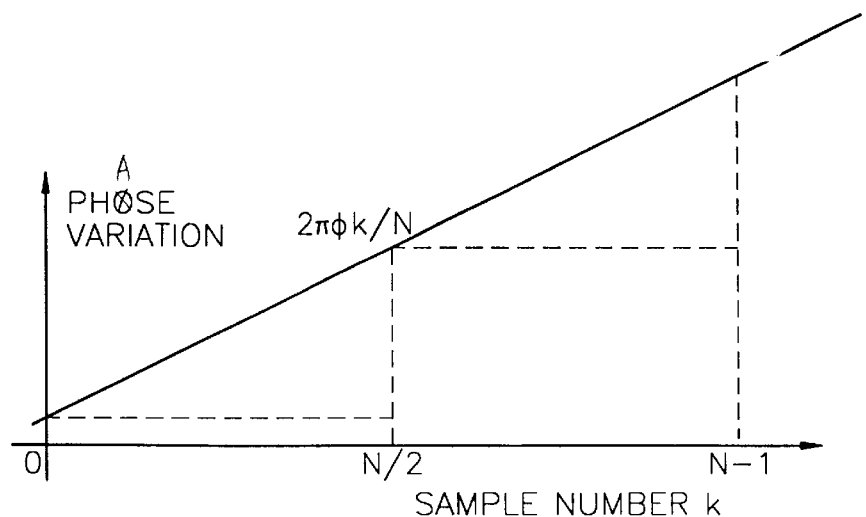
FIG. 10 is a graph showing the phase variation due to a frequency offset of φ/T Hz in OFDM symbol samples.

The second synchronization step of the present invention is carrier frequency synchronization. If a constant frequency offset φ/T Hz exists in the received signal, the phases of signal samples vary. Here, the variation value linearly increases by 2πφ/N radians per sample. FIG. 10 shows the phase variation which is additionally generated in a received signal due to a frequency offset. Then, the phase variation of samples $r_{k+N/2}$ behind N/2 samples is larger by πφ radian (=2πφ(N/2)/N) than the sample $r_k$. As a result, N/2 ($r_{k+d}^* r_{k+d+N/2}$) terms all have the same phase values of πφ radian at the point of time $S(d_{opt})$, and the phase value of $S(d_{opt})$ is the same. Since noise is mixed with in an actual received signal, the addition of several samples reduces the influence of noise, resulting in a more accurate value. A frequency offset can be calculated as in the following Equation 5:

$$\phi = \frac{1}{\pi}\tan^{-1}\frac{\mathrm{Im}S(d_{opt})}{\mathrm{Re}S(d_{opt})} + 2c \qquad (5)$$

wherein c is a constant. An Arctangent function can uniquely obtain a phase value ranging from $-\pi$ to $+\pi$. A frequency offset $\epsilon(|\epsilon|<1)$ can be obtained from the phase of $S(d_{opt})$ within a range of $-1/T$ to $+1/T$ Hz, as in the following Equation 6:

$$\varepsilon = \frac{1}{\pi}\angle S(d_{opt}) \qquad (6)$$

wherein $\angle S(d_{opt})$ is expressed by the following Equation 7:

$$\angle S(d_{opt}) = \tan^{-1}\frac{\mathrm{Im}S(d_{opt})}{\mathrm{Re}S(d_{opt})} \qquad (7)$$

After the frequency offset obtained within the range of $-1/T$ to $+1/T$ Hz is compensated for, an integer multiple frequency offset $2c$ is obtained at sub-carrier frequency intervals, thereby calculating the total frequency offset $\hat{\phi}$ expressed by the following Equation:

$$\hat{\phi} = \epsilon + 2c \qquad (8)$$

A frequency offset $2c$ outside the range of $-1/T$ to $+1/T$ Hz can be obtained as follows. First, if the phases of all samples for the reference symbol are compensated for by the frequency offset e within the range of $-1/T$ to $+1/T$ Hz, a frequency offset of $2c/T$ Hz still exists in the reference symbol. If the N-point FFT of the reference symbol is $R_n$, a power metric $P(u)$ can be obtained by replacing $u_{opt}$ for maximizing the power metric $P(u)$ with c, i.e., by equalizing $u_{opt}$ to c, as in the following Equation 9:

$$P(u) = \sum_n |R_{2n}|^2 B_{n+u} \qquad (9)$$

Figure 11:
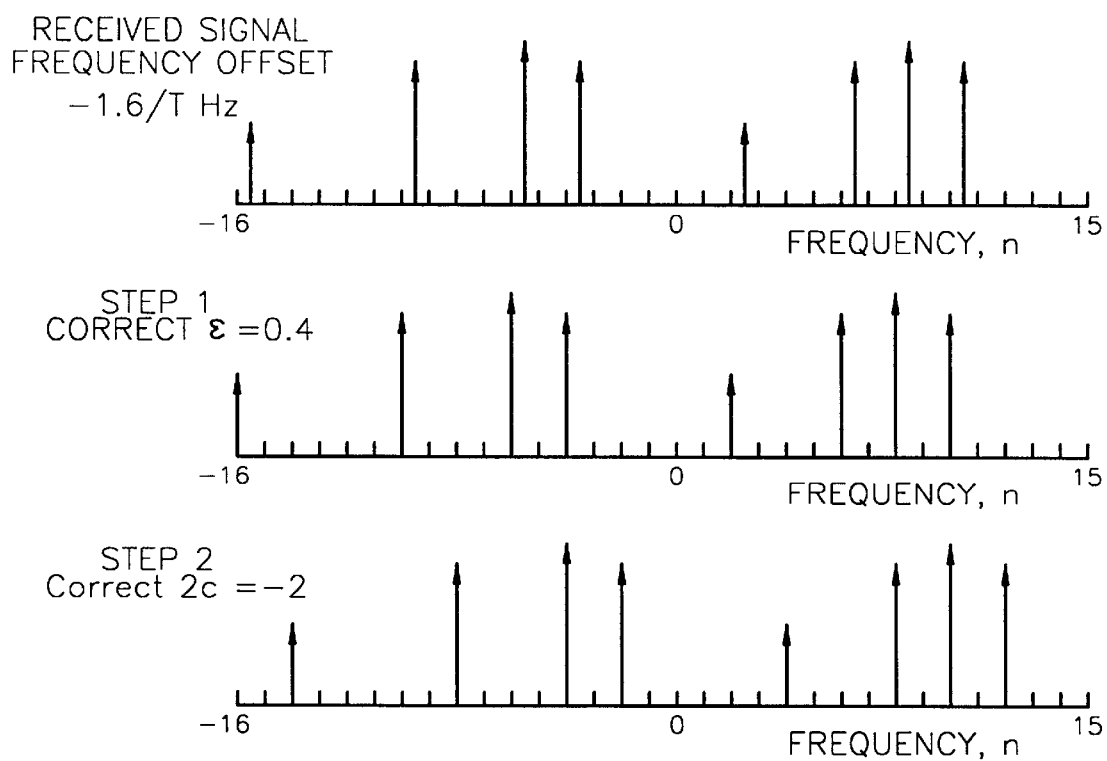
FIG. 11 illustrates a frequency offset compensating process according to the present invention.

The above Equation 9 is very simply realized because $B_n$ is only a binary value of 0 or 1. FIG. 11 illustrates a frequency offset compensating process according to the present invention. In the frequency domain, the phase and size of a received reference symbol are changed by the influence of multipath fading, and sub-carriers are displaced at different frequency positions from the original positions due to a carrier frequency offset. For example, if the frequency offset is $-1.6/T$ Hz, the phase of $S(d_{opt})$ becomes $-1.6 \pi$. However, when the phase of $S(d_{opt})$ is calculated using the arctangent function, 0.4n radian is obtained instead of $-1.6 \pi$ radian because $\exp(-j1.6 \pi)$ is equal to $\exp(j0.4 \pi)$. After the frequency offset $\epsilon$ of $0.4/T$ Hz obtained as described above is compensated for, the $-2/T$ Hz frequency offset remains, i.e., c is equal to $-1$. Next, in the frequency domain, the $-2/T$ Hz frequency offset is compensated for by obtaining u (=-1) for maximizing the correlation $P(u)$ between a reference symbol signal and $B_o$ in the frequency domain. The OFDM receiving portion compensates for the frequency offsets of user symbol samples with the frequency offset obtained as described above using a digital signal processing method, or compensates for them by directly changing the frequency of a local oscillator.

Figure 12:
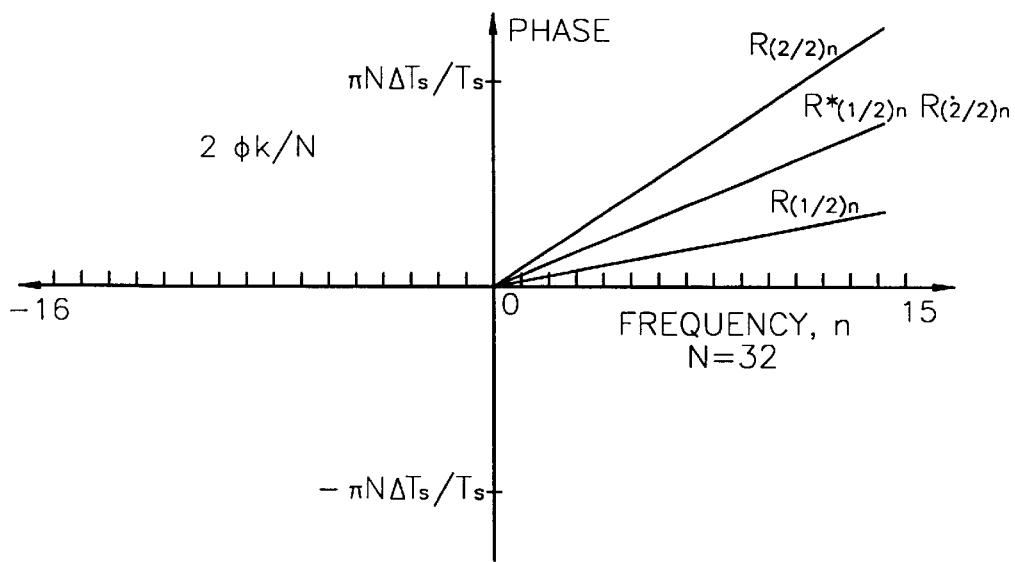
FIG. 12 is a graph showing the phase variation which is added to $R_{(\ )n}$ and $R_{(2/2)n}$ due to a sampling error $\Delta$ Ts/Ts.

The third step of the present invention is synchronization of the sampling clock frequency of a receiver. First, the exact starting point $d_{opt}$ of a symbol is found by performing the above first and second steps, the frequency offset is obtained and compensated for, and the third step is then performed. When the sampling clock frequency f's (=1/T's) of the receiver is not exactly synchronized with the clock frequency fs (=1/T's) of a transmitter, and an error of $\Delta$ts exists between the sampling period T's (=Ts+$\Delta$Ts) of the receiver and the sampling period Ts of the transmitter, the phase of a received signal of a sub-carrier n varies in units of $2 \pi n k_0 \Delta$ Ts/MTs in the frequency domain, and the degree of phase variation increases in proportion to the sub-carrier index n, the starting point $k_0$ of an FFT section, and the sampling period error $\Delta$Ts/Ts. Here, M denotes the number of FFT points. N samples of a reference symbol are divided into two, and the first N/2 samples and the remaining N/2 samples are N/2-point fast-Fourier-transformed. The results are referred to as $R_{(\ )n}$ and $R_{(2/2)n}$ respectively. FIG. 12 shows the phase variation of $R_{(\ )n}$ and $R_{(2/2)n}$ due to the sampling frequency error. Since the different between the FFT starting points of $R_{(\ )n}$ and $R_{(2/2)n}$ is N/2 samples, the difference in phase variation is $2 \pi n(N/2)\Delta$ Ts/(N/2)Ts $(=2 \pi n\Delta$ Ts/Ts). Except for noise, $R_{(\ )n}$ and $R_{(2/2)n}$ are exactly the same if there is no sampling frequency error. Hence, the phase of $R_{(1/2)n}{}^* R_{(2/2)n}$ is $2 \pi n\Delta$ Ts/Ts as in the following Equation 10:

$$\angle\{R_{(1/2)n}{}^* R_{(2/2)n}\} = 2\pi n\Delta T_s/T_s \qquad (10)$$

The sampling period error is expressed by the following Equation 11:

$$\Delta T_s/T_s = \frac{1}{2\pi}\frac{1}{n}\angle\{R^*_{(1/2)n}R_{(2/2)n}\} \qquad (11)$$

It is assumed that $\Theta$ is a set of frequencies at which a signal is transmitted. If then, a sub-symbol value is not 0, and a signal is transmitted, at only a frequency where $B_n$ is equal to 1, so that $\Theta$ is equal to $\{n:B_n=1\}$. A more accurate sampling period error value can be obtained by the following Equation 12:

$$\Delta T_s/T_s = \frac{1}{2\pi}\sum_{n\in\Theta}\frac{|R^*_{(1/2)n}R_{(2/2)n}|^2 \angle\{R^*_{(1/2)n}R_{(2/2)n}\}}{\sum_{n\in\Theta}|R^*_{(1/2)n}R_{(2/2)n}|^2} \qquad (12)$$

Equation 12 reduces the influence of noise by calculating the average value of several frequencies, and take into account the effect of a multipath fading because values are reflected in proportion to the power of a received signal. As a consequence, $R_{(\ )n}$ and $R_{(2/2)n}$ are obtained by N/2-point fast-Fourier-transforming the first N/2 samples and the remaining N/2 samples of the reference symbol, respectively, and $R_{(\ )n}$ and $R_{(2/2)n}$ are substituted into Equation 12, thereby obtaining the sampling period error. An N/2-point FFT value can also be obtained by N-point FFT. The OFDM receiving portion changes the sampling frequency for digital signals by sampling the digital signals again with a new sampling frequency value using a digital signal processing method, or directly changes the frequency of a sampling clock signal.

The sampling period error can also be obtained by multiplying each term in the numerator by n and summing the multiplied terms instead of dividing each term by n as in Equation 12, and by multiplying each term in the denominator by $n^2$ and summing the multiplied terms as in the following Equation 13:

$$\Delta T_s / T_s = \frac{1}{2\pi} \sum_{n \in \Theta} \frac{n |R^*_{(1/2)n} R_{(2/2)n}|^2 L\{R^*_{(1/2)n} R_{(2/2)n}\}}{\sum_{n \in \Theta} n^2 |R^*_{(1/2)n} R_{(2/2)n}|^2} \quad (13)$$

It can be seen from the results of simulation that the result of Equation 13 is always superior to that of Equation 12.

The N/2-point FFT value $R_{(\ )n}$ is obtained by an N-point FFT in various ways. N/2 samples $r_{k+d_{opt}}$ are designated as even-numbered inputs of an N-point FFT, and the remaining odd-numbered inputs are all set to 0. In this case, the first N/2 samples of the N-point FFT results are the same as those for the remaining N/2 samples, and $R_{(\ )n}$ is taken as the first N/2 samples of the N-point FFT results. Alternatively, N/2 samples $r_{k+d_{opt}}$ are repeated twice, and designated as the input of an N-point FFT. Then, the output of an N-point FFT has values at even-numbered indices, and is zero at odd-numbered indices. Thus, $2R_{(\ )n}$ is taken as the even-numbered outputs of the N-point FFT. Alternatively, N/2 samples $r_{k+d_{opt}}$ are designated as the first N/2 inputs of an N-point FFT, and the remaining inputs are all set to 0. Then, $R_{(\ )n}$ is taken as the even-numbered values at the output of the N-point FFT. Alternatively, the first N/2 inputs of the N-point FFT are all set to 0, and the remaining N/2 inputs are assigned to the N/2 samples $r_{k+d_{opt}}$, respectively. Then, $R_{(\ )n}$ is taken as the even-numbered outputs of the N-point FFT.

Meanwhile, the present invention can be accomplished in a software system but can also be accomplished in a hardware system.

According to the present invention, instead of performing symbol timing synchronization, carrier frequency synchronization, and sampling clock synchronization using the conventional two symbols, all of the above-described steps are performed using only one reference symbol. Thus, overhead of synchronization is reduced. However, the performance and complexity of the present invention are the same as those of the prior art.

What is claimed is:

1. A method of synchronizing an OFDM receiver to an OFDM signal comprising the steps of:
   (a) receiving an OFDM reference symbol before user data OFDM symbols, the OFDM reference symbol having sub-symbol signals at only random, even-numbered sub-carriers and having no signals at any other even-numbered sub-carriers and all odd-numbered sub-carriers in the frequency domain, and the first half of the symbol having the same characteristics as the remaining half in the time domain;
   (b) obtaining OFDM digital signal samples $r_k$ by sampling the received OFDM reference symbol and converting the OFDM reference symbol samples into digital signals;
   (c) obtaining a predetermined timing metric for each of the OFDM signal samples $r_k$ according to the time-domain characteristics of the reference symbol, and detecting the point in time at which the power of the timing metric is maximum as the starting point of a symbol/frame of the OFDM signal; and
   (d) correcting for the offsets of sub-carrier frequencies that are less than the frequency spacing between two adjacent sub-carriers by obtaining a frequency offset from the phase of the timing metric at the detected symbol/frame starting point, and correcting for the offsets of sub-carrier frequencies that are greater than the frequency spacing between two adjacent sub-carriers by obtaining the value which maximizes the power metrics according to the frequency-domain characteristics of the reference symbol.

2. The method of claim 1, wherein the reference symbol is obtained by the steps of:
   producing a frequency-domain sub-symbol sequence $C_n$ from a random or pseudo-random sequence;
   producing a random or pseudo-random binary sequence $B_n$ having values of 0 and 1;
   producing a frequency-domain OFDM reference symbol sequence by multiplying $C_n$ and $B_n$ as in the following Equation: and $$X_n = \begin{cases} C_{n/2} B_{n/2}, & n = \text{even number}, \ n \neq 0 \\ 0, & \text{elsewhere} \end{cases}$$

producing a time-domain OFDM reference symbol sequence by performing an inverse fast Fourier transformation (IFFT) on the produced frequency-domain OFDM reference symbol sequence.

3. The method of claim 2, wherein the sub-symbol sequence $C_n$ in the OFDM reference symbol is a phase shift keyed (PSK) sub-symbol or a quadrature amplitude modulated sub-symbol.

4. The method of claim 1, wherein the symbol timing metric S(d) is obtained by the following Equation:

$$S(d) = \sum_{k=0}^{N/2-1} r^*_{k+d} r_{k+d+N/2}$$

wherein N is the size of a reference symbol and $r_k^*$ is the complex conjugate of $r_k$.

5. The method of claim 4, wherein the step (c) of detecting the starting point of a symbol/frame comprises the substeps of:
   (c1) calculating the power $|S(d)|^2$ of the symbol timing metric;
   (c2) comparing the power $|S(d)|^2$ with a predetermined threshold value;
   (c3) increasing the timing index (d); and
   (c4) consecutively repeating steps (c1), (c2) and (c3), detecting an index ($d_{opt}$) maximizing the $|S(d)|^2$ during the time when the $|S(d)|^2$ is greater than the threshold value, and replacing the detected $d_{opt}$ with the symbol/frame starting point.

6. The method of claim 5, wherein the step (d) comprises the substeps of:
   (d1) calculating the timing metric $S(d_{opt})$ at the detected symbol/frame starting point $d_{opt}$;
   (d2) obtaining an estimate $\epsilon/T$ Hz of a carrier frequency offset $\Delta f_c$ from the phase of $S(d_{opt})$ at $d_{opt}$ by the following Equation:

$$\pi\varepsilon = LS(d_{opt}) = \tan^{-1} \frac{\text{Im} S(d_{opt})}{\text{Re} S(d_{opt})}$$

when the period of a symbol excluding a cyclic prefix added to prevent inter-symbol interference is indicated by T;
   (d3) correcting for the estimate $\epsilon/T$ Hz so that it is in the range of $-1/T$ to $+1/T$ Hz of the carrier frequency;
   (d4) obtaining frequency-domain sub-symbols $R_n$ by performing a discrete Fourier transformation (DFT) on N samples in the compensated reference symbol; and (d5) correcting for the frequency offset in the outside of the range of −1/T to +1/T Hz by estimating the frequency offset which maximizes the correlation value between the power spectrum $|Rn|^2$ of $R_n$ and the random or pseudo-random binary sequence $B_n$.

7. The method of claim 6, wherein the step (d5) comprises the substeps of:

(d51) obtaining a power metric P(u) with respect to a frequency offset index (u) as in the following Equation:

$$P(u) = \sum_n |R_{2n}|^2 B_{n+u}$$

(d52) increasing the frequency offset index; and (d53) correcting for $2u_{opt}/T$ Hz with the frequency offset in the outside of the range of −1/T to +1/T Hz when P(u) is obtained by repeating steps (d51) and (d52) until p(u) varies from −K to +K and the frequency offset $u_{opt}$ which maximizes P(u) is detected, given a predetermined value K.

8. The method of claim 1, further comprising:

(e) obtaining frequency-domain sequences $R_{(1/2)n}$ and $R_{(2/2)n}$ by performing an N/2-point discrete Fourier transformation on the first group of N/2 samples and the remaining group of N/2 samples among N samples of the carrier frequency offset corrected reference symbol;

(f) obtaining the phase difference $\angle\{R_{(1/2)n}^* R_{(2/2)n}\}$ between $R_{(1/2)n}$ and $P_{(2/2)n}$, and obtaining the error between the sampling period of a transmitter and the sampling period of step (b) as in the following Equation:

$$\Delta T_s / T_s = \frac{1}{2\pi} \frac{1}{n} \angle\{R_{(1/2)n}^* R_{(2/2)n}\}; \text{ and}$$

(g) correcting for the obtained sampling period error.

9. The method of claim 8, wherein the sampling period error $\Delta T_s/T_s$ in step (f) is obtained from the phase variation generated in each sub-carrier of a received signal due to an error between two sampling periods, as in the following equation:

$$\Delta T_s / T_s = \frac{1}{2\pi} \frac{\sum_{n\in\Theta} |R_{(1/2)n}^* R_{(2/2)n}|^2 \angle\{R_{(1/2)n}^* R_{(2/2)n}\}}{\sum_{n\in\Theta} |R_{(1/2)n}^* R_{(2/2)n}|^2}$$

wherein Q={n:$B_n$=1} denotes a set of frequencies at which signals are transmitted from the OFDM reference symbol, and $T_s$ and ($\Delta T_s + T_s$) denote the sampling period of a transmitter and the sampling period of step (b), respectively.

10. The method of claim 8, wherein the sampling period error $\Delta T_s/T_s$ in step (f) is obtained from the phase variation generated in each sub-carrier of a received signal due to an error between two sampling periods, as in the following equation:

$$\Delta T_s / T_s = \frac{1}{2\pi} \frac{\sum_{n\in\Theta} n |R_{(1/2)n}^* R_{(2/2)n}|^2 \angle\{R_{(1/2)n}^* R_{(2/2)n}\}}{\sum_{n\in\Theta} n^2 |R_{(1/2)n}^* R_{(2/2)n}|^2}$$

wherein Q={n:$B_n$=1} denotes a set of frequencies at which signals are transmitted from the OFDM reference symbol, and $T_s$ and ($\Delta T_s + T_s$) denote the sampling period of a transmitter and the sampling period of step (b), respectively.

11. An apparatus for synchronizing an OFDM receiver, comprising:

an OFDM signal receiving portion for receiving an OFDM reference symbol before user data OFDM symbols, the OFDM reference symbol having sub-symbol signals carried by random, even-numbered sub-carriers and having no signals carried by the other even-numbered sub-carriers and all odd-numbered sub-carriers in the frequency domain, and the first half of the symbol has the same characteristics as the second half in the time domain;

an analog-to-digital converter (ADC) for sampling the received OFDM reference symbol, converting the OFDM reference symbol samples into digital signals, and outputting OFDM digital signal samples $r_k$; and an operation processor for storing the OFDM digital signal samples $r_k$ in an internal buffer, detecting the starting point of a symbol/frame which satisfies a predetermined timing metric, from the time-domain characteristics of the stored samples, obtaining a carrier frequency offset from the phase of the metric at the detected starting point and correcting for the offset, and obtaining the sampling period error of the ADC from the phase difference generated when the stored N samples are transformed into two N/2 frequency-domain symbols and correcting for the error.

12. The apparatus of claim 11, wherein the frequency-domain reference symbol sequence received from the OFDM signal receiving portion is obtained from a frequency-domain sub-symbol sequence $C_n$, produced from a random or pseudo-random sequence, and a random or pseudo-random binary sequence $B_n$ having values of 0 and 1, as in the following equation:

$$X_n = \begin{cases} C_{n/2} B_{n/2}, & n = \text{even number}, \; n \neq 0, \\ 0, & \text{elsewhere} \end{cases}$$

and the first half of a time-domain OFDM reference symbol sequence, obtained by performing an inverse fast Fourier transformation (IFFT) on the produced frequency-domain OFDM reference symbol sequence, has the same characteristics as the second half.

13. The apparatus of claim 12, wherein the frequency-domain sub-symbol sequence $C_n$ in the OFDM reference symbol is a phase shift keyed (PSK) sub-symbol or a quadrature amplitude modulated sub-symbol.

14. The apparatus of claim 11, wherein the operation processor includes a means for obtaining a timing metric S(d) with respect to a timing index (n) as in the following Equation:

$$S(d) = \sum_{k=0}^{N/2-1} r_{k+d}^* r_{k+d+N/2}$$

wherein $r_k^*$ is the complex conjugate of $r_k$ and detecting the index ($d_{opt}$) which maximizes the power of the timing metric while the power of the obtained timing metric is greater than a threshold value, and replacing the detected $d_{opt}$ with a symbol/frame starting point.

15. The apparatus of claim 14, wherein the operation processor comprises a means for correcting for carrier frequency offsets by calculating the timing metric at the detected symbol/frame starting point $d_{opt}$ and obtaining a carrier frequency offset estimate $\epsilon$/T Hz from the phase of ∠S($d_{opt}$) of the obtained timing metric as in the following Equation:

$$\pi\varepsilon = \angle S(d_{opt}) = \tan^{-1}\frac{\text{Im}S(d_{opt})}{\text{Re}S(d_{opt})}, \text{ and}$$

correcting for carrier frequency offsets in the outside of the range of −1/T to +1/T Hz by obtaining $u_{opt}$ from frequency-domain sub-symbols $R_n$ obtained by performing a discrete Fourier transformation (DFT) on N samples in the corrected reference symbol, the $u_{opt}$ which maximizes the following Equation:

$$P(u) = \sum_n |R_{2n}|^2 B_{n+u}$$

wherein $B_n$ is a random or pseudo-random binary sequence having values 0 and 1.

16. The apparatus of claim 15, wherein the operation processor further comprises a means for obtaining frequency-domain sequences $R_{(\ )n}$ and $R_{(2/2)n}$ by performing an N/2-point discrete Fourier transformation on the first group of N/2 samples and the remaining group of N/2 samples among N samples of the carrier frequency-offset-corrected reference symbol, and obtaining the error between the sampling period of a transmitter and the sampling period of the ADC from a phase difference between $R_{(\ )n}$ and $R_{(2/2)n}$, as in the following Equation:

$$\Delta T_s/T_s = \frac{1}{2\pi}\frac{1}{\pi}\angle\{R^*_{(1/2)n}R_{(2/2)n}\}, \text{ and}$$

correcting for the obtained sampling period error.

\* \* \* \* \*